Nov. 6, 1934.   J. GRISENTI   1,979,830
AUTOMATIC GEAR CHANGING MECHANISM
Filed Jan. 17, 1934   5 Sheets-Sheet 2

INVENTOR.
JOSEPH GRISENTI
BY
ATTORNEY

Nov. 6, 1934.  J. GRISENTI  1,979,830

AUTOMATIC GEAR CHANGING MECHANISM

Filed Jan. 17, 1934   5 Sheets-Sheet 4

INVENTOR.
JOSEPH GRISENTI
BY
ATTORNEY

Patented Nov. 6, 1934

1,979,830

UNITED STATES PATENT OFFICE 1,979,830

AUTOMATIC GEAR CHANGING MECHANISM

Joseph Grisenti, San Francisco, Calif.

Application January 17, 1934, Serial No. 706,961

21 Claims. (Cl. 74—336.5)

This invention relates particularly to variable speeds gears, more especially for self propelling vehicles, wherein gear changes are made automatically in accordance with the speed of the vehicle and the load on the engine.

An object of the invention is to provide a device of the character described, which automatically shifts the transmission gears progressively in accordance with the rate of acceleration of the vehicle.

A further object of the invention is to incorporate in an automatic change speed mechanism, a degree of manual supervision, whereby the starting and stopping operations will be manually controlled, the building up of speed in the vehicle being supervised by the manual control of the engine throttle.

Other objects and advantages are to provide an automatic gear changing mechanism that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawings:

Fig. 3 is a longitudinal cross section taken through a complete automatic gear shifting apparatus constructed in accordance with my invention, and showing the gear shifting member in the fully advanced position.

In the conventional motor vehicle, forward or rearward movement of the vehicle is accomplished by disengaging the clutch between the engine and transmission, engaging any selected pair of gears, and then allowing the clutch to gradually engage, to move the vehicle in either a forward or rearward direction. With the standard and conventional type of gear shifting apparatus, it is necessary to coordinate the engine speed and vehicle speed, whereby the meshing of gears of proper ratio may be accomplished, without either injury to the gears themselves or to related parts of the mechanism. Even the best of drivers of motor vehicles often times are unable to shift gears to avoid clashing of the gears or other damage to the operating parts. With my invention the starting of the vehicle in movement, in either a forward or a rearward direction, is initiated manually, after which movement of the said vehicle at higher speeds in a forward or rearward direction is automatically accomplished by my shifting mechanism.

Figures 6, 7, 8, 9, 11, 13:
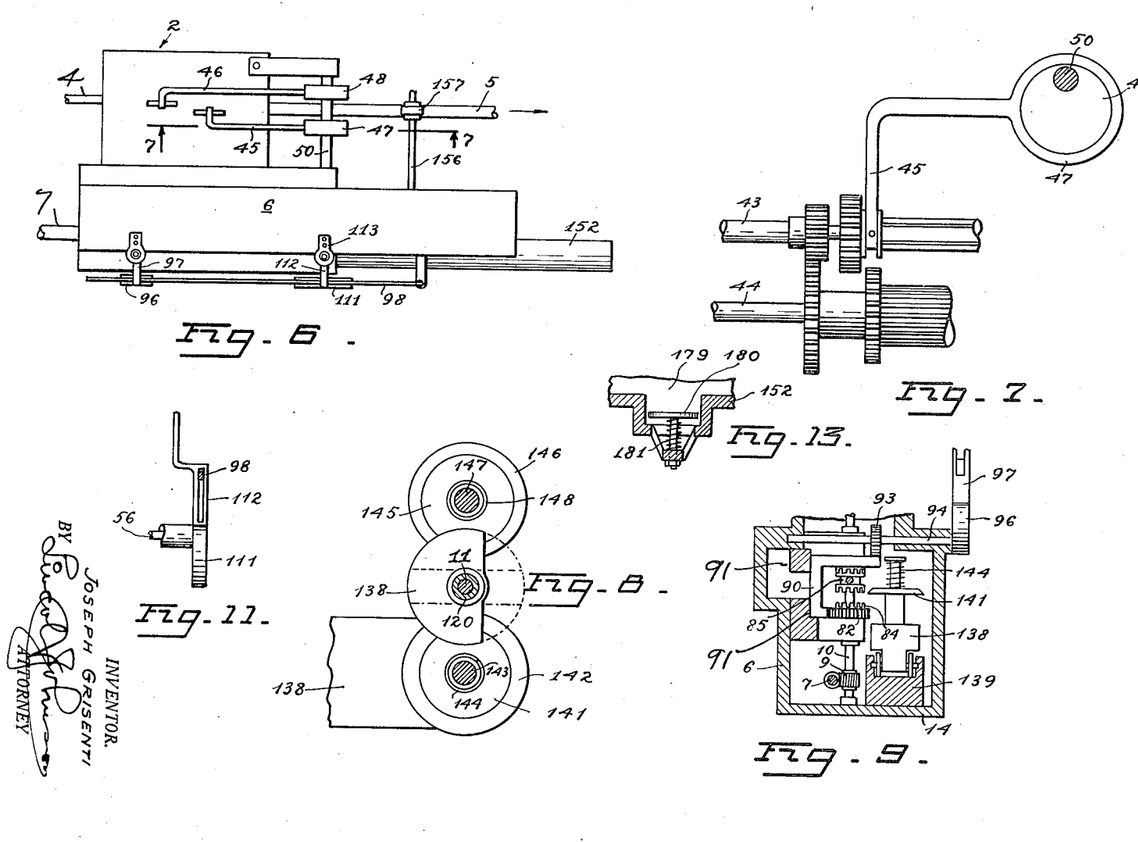
Fig. 6 is a reduced sized plan view of the automobile transmission having the gear shifting mechanism mounted thereon.
Fig. 7 is an enlarged section taken on the approximate line 7—7 of Fig. 6, to show the particular method of shifting the transmission gears.
Fig. 8 is an enlarged plan view of a fragmentary portion of the apparatus, taken upon the approximate line 8—8 of Fig. 2.
Fig. 9 is a cross section of a fragmentary portion of the apparatus taken on the line 9—9 of Fig. 2.
Fig. 11 is a side view of the master cam for operating the engine clutch.
Fig. 13 is an enlarged section taken through one of the valve ports shown in Fig. 2, on the line 13—13.

In detail the construction illustrated in the drawings comprises a prime mover or engine 1, having a conventional form of clutch combined therewith and interposed between the engine 1 and the gear box 2, shown in Fig. 6. In the gear box, the shaft 4 connects to the engine clutch, and the shaft 5 on the opposite side of said gear box 2 connects to the wheel propelling mechanism of the vehicle.

The gear shifting mechanism, constituting the subject matter of this invention, is contained within a housing 6 mounted on one side of or adjacent to the gear box 2. The change speed gears in the gear box 2, and the gear box itself, are of standard and conventional type. While I have shown the automatic gear shifting apparatus applied particularly to a standard type of gear box, it is to be understood the same would operate equally as well on a special type of gear transmission.

The housing 6 is substantially box-like in shape, being relatively narrow in width and long in length. In the lower portion of the housing 6, shown in Fig. 2, I have provided a driven shaft 7, which is operatively connected to the engine 1, ahead of the clutch, and therefore rotates in unison with the crank shaft of the engine. The shaft 7 is provided with three helical gears 8 arranged at spaced points throughout the length thereof, which gears are in meshing engagement with the helical gears 9 on each of the respective shafts 10, 11 and 12, each of said shafts being disposed in a vertical direction between the top and bottom walls 13 and 14 respectively of the box 6. Suitable bearings are provided in the box, and in which the respective shafts 10, 11 and 12 are rotatably journaled. Horizontally disposed guides 26 are provided on one side wall of the casing 6, and horizontally disposed guides 27 are provided on the opposite side wall of the casing 6.

A slide block 30 has its upper and lower edges slidably confined in the guides 26, whereby said slide block may move in either the forward direction, indicated by the arrow A, or in a rearward direction, indicated by the arrow B, to accomplish shifting of the gears in the gear box 2, as will be hereinafter explained.

The slide bar 31 has its upper and lower edges slidably confined in the guides 27, and said slide bar is fixedly connected by a cross member 32 to an end of the slide block 30, whereby the slide block 30 and the slide bar 31 will move in unison. The slide block 30 is provided with a central aperture 28 therein, the walls of which parallel the outer contour of the slide block 30. The lower edge 33 of the slot 28 is formed as a cam locking member, which is interrupted at spaced points throughout the length thereof, with gear racks or toothed portions 34, 35, 36 and 37.

The rack 34 lets the engine clutch in and out when causing the engagement and disengagement of the reversing gears in the transmission. The respective racks 35, 36 and 37, let the engine clutch in and out preparatory to moving into and from the low, intermediate and high speed gears of the transmission. The spaces between each of the gear racks 34, 35, 36 and 37 serve to hold the gear, which operates the clutch engaging and disengaging member, inoperative in the out of engagement position, and while the clutch is so held, the gears in the transmission are shifted automatically in accordance with variations in speed induced by variations in load.

The upper edge of the slot 28 in the slide block 30 is provided with a cam locking guide 15 thereon, and the same has gear racks 38 and 39 cut therein. The gear rack 38 is designed to cause the disengagement of the low speed gears and the engagement of the reverse speed gears in the transmission when the slide block 30 is moved in the direction of the arrow B, and to cause the disengagement of said reverse gears, and the engagement of the low speed gears when moved in the direction of the arrow A. Similarly the gear rack 39 causes disengagement of the low speed gear in the transmission when the block 30 is moved in the direction of the arrow A, and the engagement of the low speed gear when the block is moved in the direction of the arrow B.

The upper edge of the slide bar 31 is provided with a cam guide 40 thereon, a portion of which is interrupted at 41 and 42 with gear racks. The gear rack 41 is designed to cause the engagement of the intermediate speed gear when moved in the direction of the arrow A, and the disengagement of the intermediate gears when moved in the direction of the arrow B. The gear rack 42 is designed to cause the disengagement of the intermediate speed gear and the engagement of the high speed gear when the block 30 is moved in the direction of the arrow A, and the disengagement of said high speed gear and the engagement of the intermediate speed gear when moved in the direction of the arrow B.

It will be noted that the gear shifting racks for effecting gear changes, lie opposite the cam guide portions, which operate the clutch, whereby the gear changes may be made while the clutch is disengaged. Similarly the rack portions for letting the engine clutch in, lie opposite the cam guide portions on the gear shifting elements, whereby the engine clutch will be allowed to engage when selected gears are in mesh.

In Figs. 6 and 7, I have indicated a gear box which contains a conventional and standard type of transmission, whereby the propeller or driving shaft 5 may be driven at any one of three selected speeds ahead, or one in the reverse direction. The transmission 2 is provided with vertically aligned driving and driven shafts 43 and 44. The transmission 2 is a standard type of gear box wherein the low and reverse gears are coupled together to be actuated by a single shifting fork, and the intermediate and high gears are coupled together to be actuated by a single shifting fork.

In Fig. 7, I have shown two gears which are representative either of the low-reverse, or the intermediate-high combinations. If it be assumed that the gears shown in Fig. 7 are the low-reverse combination then the shifting fork 45 is indicated as the member for shifting said gears. A similar shifting fork 46 is provided for shifting the intermediate-high speed gears. Each of the shifting members 45 and 46 is provided with the respective straps 47 and 48 therearound, each of said straps being mounted around an eccentric 49 secured around an end of the low-reverse shifting shaft 50, and the intermediate-high shifting shaft 51 respectively. The shaft 50 extends within the casing 6 and into the slot 28 located in the slide block 30. The shifting shaft 51 likewise extends to a point adjacent the slide bar 31. A pinion 52 is mounted on the end of the shaft 50 to engage the respective reverse and low gear shifting racks 38 and 39 respectively. A pinion 53 is mounted on the end of the shaft 51 to engage the respective intermediate and high speed gear shifting racks 41 and 42, respectively.

Each of the gears 52 and 53 is provided with a squared cam 55 on the face thereof, which cams engage the cam guide surfaces 15 and 40 on the slide block and slide bar, respectively. A shaft 56 is provided in the casing 6 for effecting the engagement and disengagement of the engine clutch by movement of the slide block 30. The end of the clutch operating shaft 56 within the casing 6, is provided with a pinion 57 thereon, which meshes with the respective racks 34, 35, 36 and 37. The pinion 57 is provided with a squared cam surface 55 on the face thereof, which engages cam guides between the gear racks on the lower edge 33 of the slide block.

Figure 2:
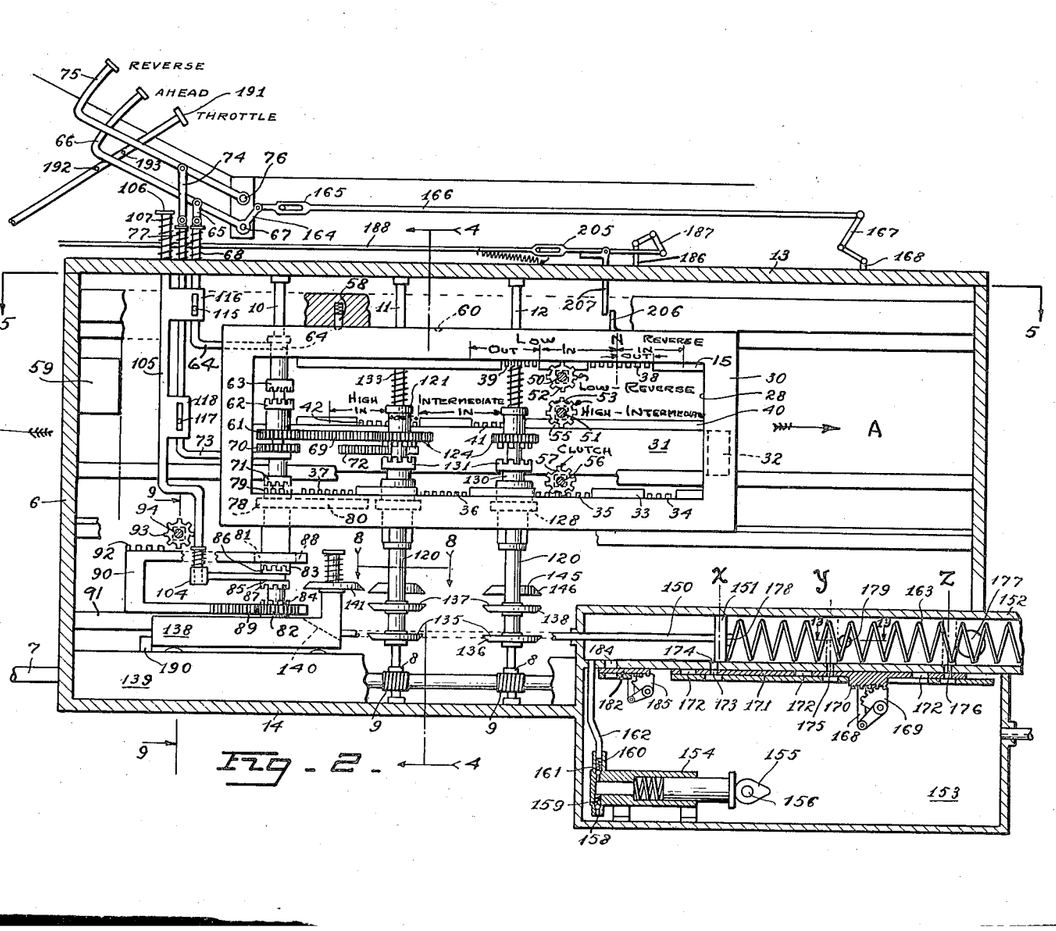
Fig. 2 is an enlarged longitudinal cross section taken through a portion of the automatic gear shifting apparatus constructed in accordance with my invention, and arranged in relation to the transmission gearing of an automobile.
Figures 4, 5:
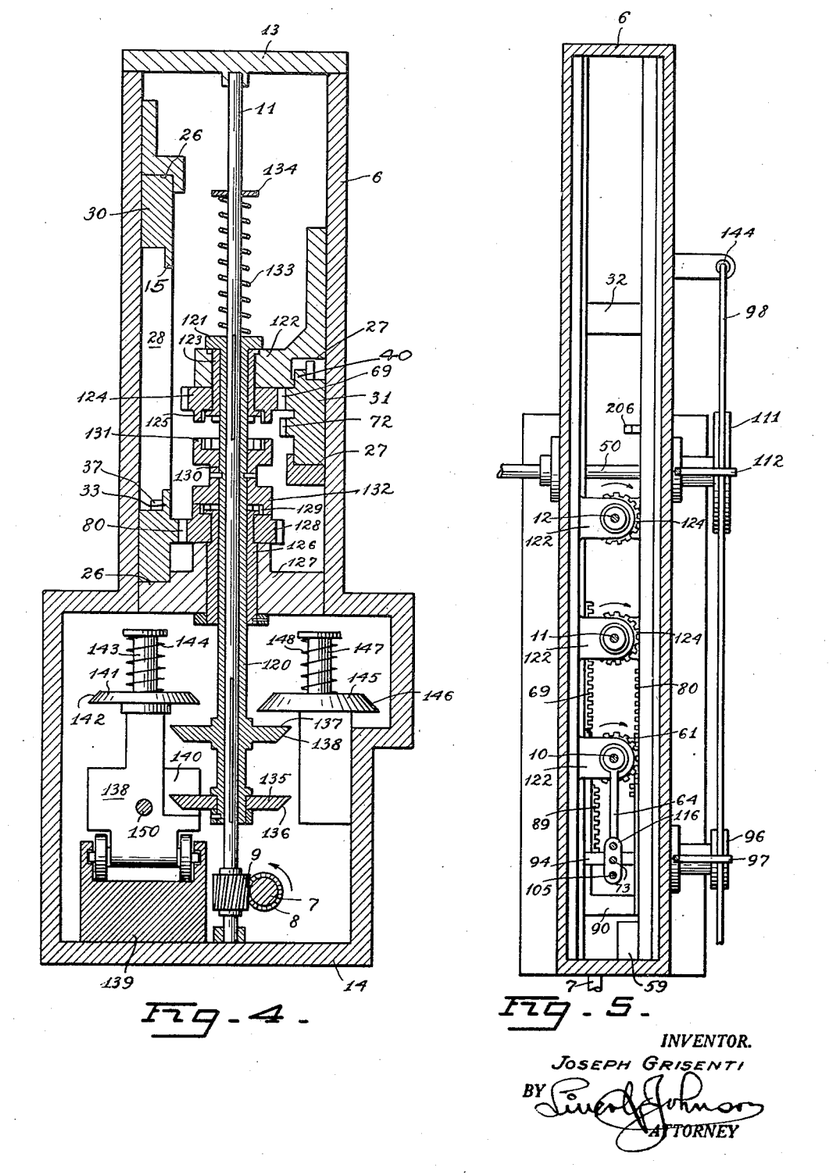
Fig. 4 is an enlarged vertical cross section taken through Fig. 2 on the line 4—4.
Fig. 5 is a plan section taken through Fig. 2 on the line 5—5.
Figures 5, 12:
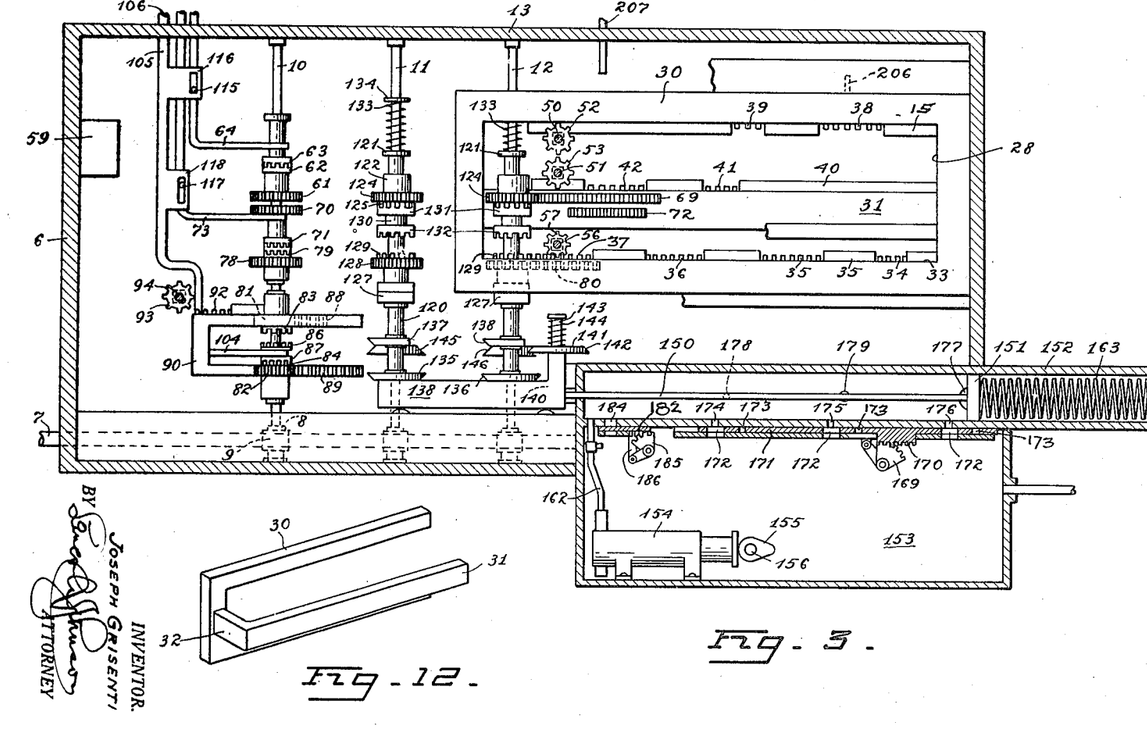
Fig. 12 is a diagrammatic illustration of the slide block and slide bar.

In the position shown in Fig. 2, the cam 55 on the pinion 52 is engaged with the cam guide 15, indicating that the low speed gears of the transmission are engaged, the pinion 53 is in an inoperative position; and the clutch pinion 57 is engaged with the rack 35, indicating that the engine clutch is engaged. When the slide block 30 advances one step in the forward direction, the rack 39 meshes with the pinion 52 and causes the low speed gears to be disengaged, and simultaneously the gear rack 41 engages the pinion 53, causing the intermediate speed gears to be engaged. When the pinion 52 causes the disengagement of the low speed gears, the cam 55 thereon rotates throughout a quarter turn to move from contact with the cam guide on one side of the rack 39 to the cam guide on the other side of said rack 39, and similarly, when the pinion 53 is rotated by the rack 41 to cause the intermediate speed gears of the transmission to engage, the cam 55 thereon moves through a one quarter turn from contact with the cam guide 40 on one side of the rack 41 to the cam guide on the other side of said rack 41. When the slide block 30 advances another step in the forward direction, the rack 42 engages the pinion 53, causing it to rotate and to thereby disengage the intermediate speed gears of the transmission and to cause the engagement of the high speed gears in the transmission. The length of the gear rack 42 is such that it causes the pinion 53 to rotate a half turn, the cam on said pinion 53 and the cam guides on the bar 31, restraining said pinion from turning more than the requisite half turn. Movement of the slide block 30 in the opposite direction, or that of the arrow B, causes the same sequence of movements of the pinions 53 and 52 as that heretofore described, until the slide block reaches the position shown in Fig. 2. When the slide block is moved in the direction of the arrow B, in order to cause the engagement of the reverse gears of the transmission, the rack 38 causes the pinion 52 to rotate throughout a half revolution, thereby disengaging the low speed gears of the transmission, and engaging the reversing gears of the transmission. The gear rack 38 occupies a space within the interrupted cam guide 15 which will cause the disengagement of the low speed gears and the engagement of the reversing gears when moved in the direction of the arrow B, and the disengagement of the reversing gears, and the engagement of the low speed gears, when moved in the direction of the arrow A. The cam guides 15 on opposite sides of the rack 38 engage the cam 55 on the pinion 52 to hold either the low speed or reverse gears of the transmission in engagement.

The racks 35, 36 and 37 on the lower edge of the slide block 30 are of a length whereby each will rotate the pinion 57 throughout a half turn when letting the engine clutch into and from engagement, and the cam guides between said racks are of a length which will engage the cam 55 on the pinion 57, and thereby hold the clutch out of engagement when the various gear shifts are being accomplished. The rack 34 for letting the clutch in or out preparatory to engaging or disengaging the reversing gear, is such that the pinion 57 will only be moved throughout a half turn. Each of the cams 55 on the respective gears 52, 53 and 57, together with the associated cam guides, prevent said gears from turning more than the requisite amount, to prevent engagement or disengagement of a selected gear in the transmission other than by forward or rearward movement of the slide block 30, and slide bar 31.

The slide block and bar always comes to a position of rest (after causing the engagement of the low, intermediate and high speed gears of the transmission) with the clutch operating pinion 57 stopped at a point midway between the ends of each of the racks 35, 36 and 37, whereby the engine clutch will be engaged. In the event the slide block and bar move rearwardly or forwardly, the meshing engagement of the clutch pinion 57 with either of the racks 35, 36 and 37, immediately causes the clutch pinion 57 to turn and to thereby effect the disengagement of the clutch, and the clutch is held in the disengaged position by the portions of the cam guide 33 adjoining the successive racks 35, 36 and 37.

The slide block and slide bar in the position shown in Fig. 2, indicate the low speed gear in the transmission in engagement, and the engine clutch engaged, from which position the slide block might be moved in the direction of the arrow A to successively engage the intermediate and high speed gears. A spring actuated pin 58 is provided in the interior of the casing 6 to engage a depression in the slide block 30, for holding said slide block in a stopped position. In order to bring the slide block into an absolutely neutral position, the axis of the pinion 52 must register with the point marked N midway between the ends of the gear rack 38, in which position the cam on the clutch operated pinion 57 would contact a cam guide and hold the engine clutch out of engagement. When the slide block moves in the direction of the arrow B, for the purpose of engaging the reversing gears of the transmission, its rearward movement is stopped by a shoulder 59 at the end of the casing 6, and also the engagement of the pin 58 with the depression 60 formed on the upper side of the slide block.

The mechanism for moving the slide block and slide bar in a forward direction, that of the arrow A, or a rearward direction, that of the arrow B, consists of gears and jaw clutches mounted on the respective vehicle shafts 10, 11 and 12. The shaft 10 is provided with a gear 61 rotatably mounted thereon, there being one-half of a jaw clutch 62 mounted on said gear 61. A complementary jaw clutch 63 is slidably splined on the shaft 10, and is adapted to be moved axially into and from engagement with the clutch part 62, to thereby couple the gear 61 directly to the shaft 10. The clutch part 63 is moved axially on the shaft 10 by means of a fork 64 which is slidably guided in the casing 6, the end of said fork outside of the casing, being pivotally connected by a link 65 to a pedal 66, which is indicated as the "ahead" pedal, said pedal 66 being pivoted to the vehicle frame at 67.

An expansion spring 68 is provided around the fork 64 between the link 65 and the upper side of the casing to hold the pedal 66 normally upward, and to maintain the clutch portion 63 normally out of engagement with the clutch bar 62. The free gear 61 on the shaft 10 meshes with a rack 69 on one face of the slide bar 31. Thus, when the slide block and the slide bar are in the neutral position, the slide block is moved the first step in the forward position, in the direction of the arrow A, to the first position shown in Fig. 2, by stepping upon the pedal 66, causing the clutch parts 63 and 62 to be brought into engagement, and thereby transmitting the rotative motion of the shaft 10 through the gear 61, to the rack 69. In order to move the slide block from the fully reversed position, that is when the end of the slide block abuts the stop 59, I have provided a gear 70 slidably splined on the shaft 10, which gear has a jaw clutch part 71 thereon.

The gear 70 is adapted to mesh with a short length rack 72 on the face of the slide bar 31. The rack 72 only meshes with the gear 70 when the slide block and bar have been moved to engage the reversing gears of the transmission. The slide block and bar are moved to disengage the reversing gears of the transmission by rotative movement of the gear 70 transmitted to the rack 72. The length of the rack 72 is such that it may only engage with the gear 70 when moving the slide block and bar from the reversed position to the absolutely neutral position. The gear 70 is held in a position on the shaft 10 to engage the rack 72, by means of a fork 73 slidably confined in the casing 6, the upper end of said fork being pivotally connected by a link 74 to the "reverse" pedal 75, which pedal is pivoted to the vehicle frame at 76.

An expansion spring 77 is interposed between the link 74 and the upper portion of the casing 6, to maintain the gear 70 in its normal position, said normal position being the one shown in Fig. 2. The slide block and bar may be moved from the low speed engaging position shown in Fig. 2, through the neutral position and to the reversing position, by means of a gear 78 loosely mounted on the shaft 10, which gear 78 has a jaw clutch part 79 thereon. The gear 78 meshes with a gear rack 80 on the face of the clutch block 30. In order to move the slide block rearwardly in the direction of the arrow B, the reverse pedal 75 is depressed, causing the fork 73 to engage the clutch part 71 on the gear 70 with the clutch part 79 on the gear 78, thereby allowing the rotative movement of the shaft 10 in a clockwise direction, through the gear 78, to move the slide block 30 rearwardly. When the slide block 30 reaches the limit of its rearward movement, the release of manual pressure from the pedal 75 permits the expansion spring 77 to move the fork 73 upwardly, and thus disengages the clutch part 71 from the part 79.

The extreme lower end of the shaft 10 is provided with gears 81 and 82 loosely mounted thereon, each of said gears having the respective clutch parts 83 and 84 thereon. A collar 85 is slidably splined on the shaft 10 between the gears 81 and 82, said collar 85 having the jaw clutch parts 86 and 87 thereon to engage alternately the jaw clutch parts 83 and 84 respectively. The gears 81 and 82 are adapted to mesh with racks 88 and 89 respectively, mounted upon the spaced legs of a substantially U-shaped slide member 90, which slide member is slidably confined in a guide 91 provided adjacent the bottom portion of the casing 6. The gear 81 causes the slide member 90 to move rearwardly in the direction of the arrow B, while the gear 82 causes the slide 90 to move forwardly in the direction of the arrow A. The slide member 90 is provided with a rack 92 to engage a pinion 93 journaled on a shaft 94 in the side of the casing 6. The pinion shaft 94 extends out through the side of the casing 6 and terminates in a cam eccentric 95. A strap 96 is provided around the cam eccentric 95 and a slotted arm 97 is provided on one side of said strap through which the clutch operating lever 98 extends. On the standard and conventional clutch operating shaft 99, I have journaled the clutch lever extension 98, which is arranged along the outside of the casing 6. The clutch pedal 100 is provided with a shoulder 101 thereon, which abuts against a shoulder 102 on the lever extension 98, whereby swinging movement of the lever 98 through the shoulder 102 will cause movement of the clutch pedal 100, and the engagement and disengagement of the clutch. The clutch pedal 100 may be actuated independently of the lever 98. The cam eccentric 95 together with its strap 96, forms an auxiliary mechanism operating on the lever 98 to engage and disengage the engine clutch independently of the engagement and disengagement of the clutch which may be effected by reciprocative movement of the slide block 30 through its contact with the main clutch engaging and disengaging apparatus.

A fork 104 is provided in the casing 6 in engagement with the collar 85 to shift the jaw parts 86 and 87 thereon, into and from engagement with the respective clutch parts 83 and 84 on the gears 81 and 82 respectively. The fork 104 is mounted on a bar 105, which bar is slidably confined in the casing 6. The upper end of the bar 105 projects out through the top of the casing and terminates in a shoulder 106. An expansion spring 107 is provided around the bar 105 beneath the shoulder to maintain the same in a normal elevated position. In order to engage the clutch, the operator steps on either of the pedals 66 or 75, thereby causing the slide 90 to move in the forward direction, bringing the rack 92 into mesh with the pinion 93, rotating said pinion a one-half turn, and likewise rotating the cam eccentric a one-half turn, to lower the arm 97 on the cam eccentric 95 downwardly, which downward movement of the arm 97 swings the clutch lever 98 from the full line position into the dotted position shown in Fig. 1. When the operator desired to disengage the clutch he releases the foot pressure from either of the pedals 66 and 75, whereby the expansion spring 107 moves the rod 105 upwardly to thereby cause engagement between the actuating gears of the slide 90, which will move the slide in a rearward direction and cause rotative movement of the pinion 93 and cam eccentric 95, to elevate the clutch lever extension 98 from the dotted line position to the full line position shown in Fig. 1. The slide member 90 and its clutch operating mechanism, is purely auxiliary to the clutch operating mechanism which causes the engagement and disengagement of the clutch when the various gear speed changes are being made automatically.

When the vehicle is being driven in the ahead or reverse directions, the engine speed is automatically controlled by the pressure of the foot applied thru either of the respective pedals 66 and 75 to the engine throttle, which pedals likewise have a slip joint connection with the apparatus which controls the operation of the pinion 93 for effecting the engagement and disengagement of the auxiliary clutch operating means. When foot pressure is applied to either the ahead pedal 66 or to the reverse pedal 75, the pinion 93 is actuated to bring the auxiliary clutch operating mechanism into position to cause the engagement of the engine clutch, and whenever the foot pressure is released from either the ahead pedal 66 or the reverse pedal 75, the pinion 93 is actuated to cause the disengagement of the engine clutch, as shown in full lines in Fig. 1. The auxiliary mechanism for engaging and disengaging the engine clutch is so related to the main mechanism for operating the clutch that both the auxiliary and main clutch operating means will operate in unison, and one will not tend to counteract the movement of the other.

The main clutch operating mechanism consists of a cam eccentric 110 mounted on the end of the pinion shaft 56 outside of the casing 6. The cam eccentric 110 is provided with a strap 111 thereon, and on which a slotted arm 112 is provided on one side thereof. The upper end of the arm 112 is slidably guided in a bracket 113 mounted on the casing 6. Thus as the pinion 57 is moved a one-half turn by the various gear racks on the lower side of the slide block 30, corresponding rotation of the cam eccentric 110 is effected, thereby moving the clutch lever extension 98 into and from dotted and full line positions shown in Fig. 1, and thereby moving the engine clutch into and from the engaged and disengaged positions. A tension spring 114 is attached to the end of the lever extension 98 and to the side of the casing 6 for holding the clutch lever down in the dotted position, to thereby keep the engine clutch in the engaged position.

The engine clutch is always disengaged through the medium of the auxiliary clutch operating apparatus, and whenever the slide block 30 is to be moved from the position shown in Fig. 2, rearwardly in the direction of the arrow B, to the reversing position, or from the reversing position to the position shown in Fig. 2, and in order to thereafter engage said clutch, I have provided a pin 115 on the fork 64 working in a slot provided on an extension 116 of the bar 105, and also a pin 117 working in a slot provided on an extension 118 of the bar 105. Thus, when either the "ahead" pedal 66 or the "reverse" pedal 75 is depressed, in order to engage jaw clutches which will move the slide block in either a forward or rearward direction, the pins 115 or 116 cause simultaneous movement of the bar 105 and the fork 104 to effect movement of the slide 90 and operation of the auxiliary clutching apparatus, whereby the engine clutch is disengaged prior to the time that the slide block 30 commences either its forward or its rearward movement.

If the vehicle comes to a stop with the low speed gears of the transmission in mesh, as indicated in the position shown in Fig. 2, and it would be desired to reverse the direction of movement of the vehicle, the operator would depress the foot pedal 75, thereby causing the fork 73 to lower and to mesh the jaw clutch parts 71 and 79 and effecting a driving connection between the gear 78 and rack 80, whereby the slide block 30 and bar 31 would start to move in the rearward direction, which movement would cause the rack 35 to rotate the clutch pinion 57 and thereby disengage the engine clutch. The downward movement of the fork 73 causes the pin 117 thereon to move freely in the slot in the extension piece 118 on the bar 105. The length of the slot within which the pin 117 moves, is such that upon initial rearward movement of the slide block and bar from the position shown in Fig. 2, and after the disengagement of the engine clutch, through the main operating clutch mechanism, the pin 117 will strike the lower end of the aforesaid slot and cause a downward movement of the bar 105 and fork 104, and a consequent engagement of the jaw clutch parts 87 and 84, whereby the slide 90 would be moved to actuate the pinion 93, and to thereby throw the auxiliary clutch operating mechanism from the disengaged position down into the engaged position. During the initial movement of the block and bar in the rearward direction, after the clutch has been disengaged by the initial movement of the clutch pinion 57, the low speed gears in the transmission are simultaneously disengaged by the rearward movement of the slide block, and the reversing gears in the transmission are engaged prior to the time that the engine clutch is let into engagement by the operation of the auxiliary clutch mechanism, through the effort of the pin 117 working in the slot in the bar 105.

The various gears on the shaft 10 are controlled manually, but operated by engine power to reciprocate the slide block and slide bar in either direction, for changing the gear speeds of the transmission from low to reverse and vice versa. Each of the driven shafts 11 and 12 is provided with driven gears which are adapted to successively engage racks on the slide block and slide bar, to move the same in a forward direction to automatically engage the intermedite speed gear of the transmission, and then to disengage said intermediate speed gear prior to engaging the high speed gears of the transmission, and in the opposite movement of the slide block the high speed gear is disengaged, after which the intermediate speed gear is engaged, and subsequently disengaged. Each of the shafts 11 and 12 is provided with identical mechanisms thereon, and only one thereof will be described. Each shaft is provided with a sleeve 120 slidably splined thereon. A shoulder 121 is provided adjacent the upper end of each sleeve to limit the downward movement of the sleeve 120, a bearing 122 being provided around the upper end of the sleeve 120 to support the same. A bushing 123 is provided around the upper end of the sleeve 120 within the bearing 122, the bushing 123 having a gear 124 rotatably mounted thereon, the bottom face of said gear having a jaw clutch 125 thereon. A bushing 126 is supported in a bearing 127 around the sleeve 120, and a gear 128 is rotatably mounted on the sleeve 126, said gear 128 having a jaw clutch part 129 thereon. A collar 130 is pinned to the sleeve 120 between the respective jaw clutches 125 and 131, the opposite ends of said collar 130 being provided with the respective jaw clutch parts 131 and 132 thereon. The sleeve 120 is adapted to be reciprocated axially on the shaft to engage the jaw clutches 131 and 132 on the collar with the jaw clutches 125 and 129 on the respective gears 124 and 128. An expansion spring 133 is provided around the shaft between the upper end of the sleeve 120 and a stop collar 134 secured to the shaft. The gear 134 registers with and is adapted to mesh with the rack 69 on the slide bar 31, while the gear 128 registers with and is adapted to engage the rack 80 on the slide block 30.

The rack 69 is of a length sufficient to mesh with both gears 124 on the shafts 11 and 12 when moving the slide bar in the forward direction, although only one of the gears 124 will drive the rack 69, and similarly, the rack 80 is of a length sufficient to mesh with both gears 128 when moving the slide block in the rearward direction, although only one of the gears 124 will drive the rack 80.

The extreme lower end of the sleeve 120 is provided with a circular disc 135 rotatably mounted thereon, said disc 135 having a downwardly beveled peripheral edge 136. A disc 137 of like diameter is mounted on the sleeve 120 in spaced relation to the disc 135, said disc 137 having a downwardly beveled peripheral edge 138, and a portion of its circumference cut away, whereby the disc 137 is slightly larger in area than one-half of a disc of the same diameter. The lower disc 135 is adapted to elevate the sleeve 120 with the jaw clutch parts thereon, while the disc 137 is adapted to maintain the sleeve 120 in the elevated position.

The disc 135 on the sleeve 120 is elevated by means of a reciprocatable carriage 138, which moves lengthwise along the bottom of the casing 6 in a trackway 139. The carriage 138 is provided with an inclined surface 140 on its forward end, which inclined surface 140 moves against the beveled edge 136 of the disc 135, and thereby causes the disc and sleeve 120 to raise vertically on the shaft. A disc 141 having an upwardly inclined beveled edge 142 is rotatably mounted on a pin 143 secured on the upper edge of the carriage 138, there being an expansion spring 144 interposed between the upper end of the pin 143 and the disc 141, to normally hold the disc 141 seated on the upper side of the carriage. The disc 141 normally lies above the plane of the disc 137, and the disc 141 and carriage 138 are arranged on one side of the shafts 11 and 12. On the opposite side of the casing 6, opposite each of the shafts 11 and 12, I have arranged a disc 145 having its peripheral edge 146 beveled upwardly, said disc being rotatably mounted on a pin 147, there being an expansion spring 148 interposed between the upper end of the pin 147 and the face of the disc 145. The disc 145 is slightly thicker than the disc 141.

As the inclined leading edge of the carriage 138 engages the lower disc 135, the sleeve 120 is elevated axially as the edge of the disc 135 rotates about the inclined surface 140 of the carriage. The lifting action of the sleeve 120 causes the upper face of the disc 137 to engage and to first lift vertically upward, the stationary disc 145 on the casing, and secondly, the disc 141 on the carriage. As stated, the upper face of the half disc 137 rotates relatively to the under face of the disc 145, and the cut away portion of the disc 137, when it lies substantially tangent with the periphery of the disc 145 permits said disc 145 to drop under the action of the expansion spring 148, thereby causing the downwardly inclined beveled edge 138 of the rotating half disc 137 to engage and ride upwardly on the upwardly beveled edge 146 of the disc 145 which has dropped, thereby causing the jaw clutch 131, which is a fixed part of the sleeve 120, to move into engagement with the jaw clutch 125, and to thereby rotate the gear 124 in unison with the shaft on which it is mounted. As the disc continues to turn about the upper or beveled face of the disc 145, the cut away portion of said disc 137 gradually rotates until it is in a position tangent to the periphery of the disc 141 on the carriage, at which point the disc 141 immediately drops to a point below the disc 137, so that thereafter the beveled side of the disc 137 continues to rotate upon the upwardly beveled portions of the discs 141 and 145, and directly thereafter, the lower disc 135 on the sleeve 120 moves into a position on the upper side of the carriage 138 and thereby holds the jaw clutch parts 131 and 125 in engagement. When the lower disc 135 rests on the upper face of the carriage 138, the upper half of the disc 137 is raised slightly above the plane of the discs 141 and 145, as shown in Fig. 3, so that when the carriage 138 starts to move in the rearward direction, the disc 141 thereon may move freely beneath the beveled edge 138 on the half disc 137. By varying the ratio of the diameters of the discs 141 and 145 with respect to the diameter of the disc 137, as well as the tangent point on said disc 137, it is possible to cause the engagement and disengagement of the jaw clutch parts actuated by said discs at selected driving speeds of the vehicle. The action of the disc 137 in passing from below the opposite discs 141 and 145 to the upper side thereof, is comparable to the axial movement which takes place in any threaded shaft or screw. The flat or cut away side of the disc 137 constantly rotates and as a result in its rotation, the flattened side thereof will, in each complete revolution, assume a position tangent to the circumference of one of the discs 141 and 145, and 180 degrees later assume a position tangent to the circumference of the other disc. The disc 145 being thicker than the disc 141, registers first with the flattened side of the center disc 137 so that the disc 145 will drop to a point where the downwardly inclined peripheral of the center disc 137 may ride up thereupon, after which the other disc 141 will drop, and thereafter the center disc 137 will rotate continuously on the beveled supporting discs on opposite sides thereof.

When the carriage 138 stops at a position opposite the shaft 11 and the gear 124 has been coupled to the shaft 11 to rotate therewith, said gear 124 meshes with the rack 69, and causes the block 30 to move one step forward, during which movement of the block 30 the low speed gear is disengaged and the intermediate speed gear is engaged.

When the carriage 138 advances the next step forward to a point opposite the shaft 12, the gear 124 on the shaft 11 becomes inoperative and the slide bar and block thus remain with the transmission gears engaged in the intermediate position. When the carriage 138 lies opposite the shaft 12, the lower disc 135 on said shaft raises the sleeve 120 and the upper disc 137 in the same manner as that heretofore described, until the flat sided disc 137 rides upwardly on the discs 141 and 145 and causes the jaw clutch 131 on the shaft 12 to engage the jaw clutch 125, and thus rotate the gear 124 on said shaft 12 in a clockwise direction, which rotation causes the rack 69 to move the slide bar and block in the direction of the arrow A, and into the position indicated in Fig. 3. At this point the rack 69 moves out of meshing engagement with the gear 124. When the slide bar and block are moved from a position of operative engagement with the gears on the shaft 11, into a position of operative engagement with the gears on the shaft 12, the rack 42 on said slide bar and block, cause the gears of the transmission to be shifted from intermediate and into high speed gear.

The reciprocatable carriage 138 which actuates the discs on the respective shafts 11 and 12, and which controls the forward and rearward movement of the slide block and bar, always leads or moves in advance of the movement of the slide block and bar. In other words, the carriage 138 does not actually cause the slide block and bar to move, but merely actuates mechanisms which accomplish the forward or rearward movement of the slide block and bar. The normal position of rest of the carriage 138 is indicated in Fig. 2, from which position the carriage moves its first step to a point where the disc 141 on the carriage, lies opposite the discs on the sleeve 120 on the shaft 11. When in this position, the carriage causes one of the gears on the shaft 11 to engage a rack on the slide bar and move it one step in a forward direction, at which point the slide bar stops its forward movement. The carriage 138 then moves a second step in the forward direction and stops at a point with the disc on the carriage opposite the discs on the shaft 12, at which point the shift discs are actuated to cause a gear on said shaft 12 to engage a rack on the slide bar, and to move said bar a second step in the forward direction, or that indicated in Fig. 3.

In order to maintain the slide block and bar in the forward position indicated in Fig. 3, the carriage 138 moves slightly beyond the shaft 12, which is the position in which the carriage 138 is shown in Fig. 3.

Upon the first step of movement of the carriage 138 in the reverse direction, or that of the arrow B, from the position shown in Fig. 3, the disc on said carriage moves to a position between the shafts 11 and 12, thereby withdrawing all support from the discs 135 and 137 on the shaft 12, and causing said discs, together with the sleeve thereon, to drop, thereby effecting the disengagement of the jaw clutch parts 125 and 131, and the engagement of the jaw clutch parts 132 and 129. The engagement of the aforesaid clutch parts 132 and 129 couples the gear 128 to the shaft 12 so that the clockwise movement of said gear 128, by reason of its meshing engagement with the rack 80, will cause the slide bar and block to move one step in the rearward direction and thereby cause the disengagement of the high speed gears in the transmission, and the engagement of the intermediate speed gears in the transmission. In the next step of rearward movement of the carriage 138, said carriage moves from a position between the shafts 11 and 12 to a position rearward of the shaft 11, or that indicated in Fig. 2. During this movement of the carriage 138, the discs 135 and 137 on the sleeve 120 on the shaft 11, drop through the force of gravity, and the action of the spring 133, causing the disengagement of the clutch parts 125 and 131, and the engagement of the clutch parts 132 and 129, thereby coupling the gear 128 to the sleeve on the shaft 11, whereby relative movement thereof, through meshing engagement with the rack 80, will move the slide block and bar rearwardly into the position shown in Fig. 2. Further rearward movement of the slide block and bar is accomplished by manual actuation of the gears on the shaft 10 in the manner heretofore described.

The carriage 138 is reciprocated by means of a pressure mechanism which includes a shaft 150, attached to an end of the carriage 138. The other end of the shaft 150 is provided with a plunger 151 thereon, operatively mounted in a cylinder 152. The cylinder 152 is operatively related to a casing 153 acting as a sump or reservoir for oil or other fluid to be used for creating a pressure against the plunger 151 in the cylinder 152.

A reciprocating pump 154 is mounted within the reservoir 153, the plunger 151 of said pump being operated by a cam 155, which in turn is directly connected to the wheel drive shaft 5 thru a shaft 156 and meshing gears 157 on the shaft 156 and shaft 5 respectively. The cylinder of the pump 154 is provided with an inlet port 158 having a check valve 159 mounted therein, and an outlet port 160 provided with a check valve 161 therein. The outlet port 160 is connected by a pipe 162 to the cylinder 152, to supply fluid under pressure thereto. The fluid which is placed under pressure by the pump 154, is directed into the cylinder 152 causing the plunger 151 to move axially therein and to compress the expansion spring 163. Movement of the plunger 151 causes corresponding movement of the carriage 138, and causes the disc 141 on said carriage to successively engage the discs 135 and 137 on the shafts 11 and 12.

The fluid pressure to be developed by the pump 154 depends entirely on the speed of rotation of the vehicle propelling shaft, and as the vehicle speed increases, fluid pressure is developed in proportion, so that the fluid pressure directed against the plunger 151 thereafter causes the carriage 138 to be moved forwardly, in the direction of the arrow A, on the guide 139. In the event the vehicle speed is sufficient to develop necessary pressure in the cylinder 152, the carriage 138 is pulled forward an additional step to a point opposite the shaft 11, as heretofore described. If the vehicle speed is sufficient to generate enough pressure in the cylinder 152, the carriage 138 is advanced another step in the forward direction to a point opposite the shaft 12 as heretofore described, after which the carriage 138 continues its forward movement until the end of the carriage abuts the end of the housing, as shown in Fig. 3. At this point the carriage 138 is in position to move in the reverse direction, or that of the arrow B, in readiness to engage either the intermediate or low speed gears in the event the speed of the vehicle could not be maintained in high. As long as the carriage 138 remains in the position shown in Fig. 3, the vehicle will be maintained in high or direct drive.

The carriage 138 is advanced in the forward direction by the fluid pressure generated by the pump 154 in accordance with the speed of the vehicle. It will be noted that the cam 155 which actuates the pump 154, is driven by a shaft drivingly connected to the propeller shaft of vehicle as shown in Fig. 6. The speed of rotation of the propeller shaft causes the pump to develop pressure in direct proportion to the vehicle speed. Relatively low pressure is developed where the speed of the vehicle is low, and as the speed of the wheels increases, the fluid pressure is likewise increased.

Heretofore the action of moving the carriage 138 with the disc 141 thereon, with relation to the gear shifting members in the forward direction, has been traced without describing the intimate functions played by the plunger 151 in such operation. As heretofore described, initial movement of the vehicle is commenced by depressing the foot pedal 66, which manually causes connections to be made to effect the first or initial step of movement of the carriage 138, in which operation the sleeve 120 is raised to engage the gear 124 and rack 69. The pedal 66 which actuates the lift bar 64, is provided at its end with an arm 164, which in turn is connected by a slip link 165, rod 166, bell-crank 167 and link 168 to a gear segment 169 in the reservoir 153. The gear segment 169 meshes with a rack 170 on a ported slide valve 171, having a plurality of equally spaced ports 172 and 173 arranged in operative relation to longitudinally disposed ports 174, 175 and 176, communicating with the cylinder 152. The action of depressing the foot pedal 66 simultaneously raises the bar 164 and link 168, to cause movement of the slide valve 171 to discommunicate the ports 173 to register the valve ports 172 with the ports 174, 175 and 176 in the cylinder 152. By opening said ports 172 at the start of operation, it results that when the vehicle starts to move and the pump 154 starts to work, low pressure will be gradually accumulated in the cylinder 152 to work against the piston 151. As this pressure develops in accordance with the speed of movement of the vehicle, the piston 151 is caused to move against the compression spring 163 and to thereby advance the carriage 138 and disc 141 through the shifting of the gears, in a forward direction, as heretofore described. The ports 172 are larger than the ports 173 so that the pressure from the cylinders 152 may be discharged throughout a substantial interval of time for better control of the operation of the apparatus.

In Fig. 2, the piston 151 is shown in full lines in the normal or starting position, wherein the low speed gears in the transmission are engaged and the piston remains at position X until the wheel speed is increased to a point where additional pressure can be built up in the cylinder 152. Additional movement of the piston 151 in the forward direction, can only be obtained by the speed of the vehicle increasing to a point where the pump will develop pressure sufficient both to move the piston 151 and to take care of the additional pressure which is by-passed thru the port 174 as the piston 151 uncovers said port in its forward movement.

The diameter of the by-pass ports 174, 175 and 176 is calculated and designed with respect to the pressure developed by the pump 154 and so that movement of the piston in the forward direction can be obtained without entirely dissipating all of the pressure developed by the pump. As the vehicle speed increases, and additional pressure is built up in the cylinder 152, the piston 151 moves from the position X to the position Y, and movement of the piston from station X to station Y effects the change of speeds from the low speed to the intermediate speed. The piston 151 remains at the station Y for a sufficient period to allow the vehicle to adjust itself to the intermediate speed. As the speed of the vehicle increases sufficient to warrant the shift from the intermediate speed to the high speed, pressure is built up in the cylinder 152 to cause the movement of the piston 151 from the station Y to the station Z, during which movement of the piston 151, the transmission gears are shifted from the intermediate speed to the high speed. When the piston 151 is at the station Z, the vehicle runs in high gear and as the pressure of the pump develops its maximum pressure, the piston 151 is moved to the end of its stroke, at which time it uncovers the by-pass ports 177 in the cylinder 152, thru which ports the fluid under pressure, is returned to the reservoir 153. The pump 154, when operating at maximum capacity, develops sufficient pressure in the cylinder 152 to force the piston 151 to the limit of its forward stroke, and to maintain said piston in said position while by-passing the excess pressure thru the ports 174, 175, 176, and 177. When the pump is developing approximately two-thirds of its capacity pressure, the piston 151 is moved to shift the intermediate speed gear while by-passing a lesser amount of pressure. Similarly, when the pump is developing approximately one-third of its capacity pressure, it is capable of moving the piston to shift the low speed gear and at the same time by-pass a portion of the pressure.

The cylinder 152 is provided with valve closed ports 178 and 179 in diametrical alignment with the respective ports 174 and 175. Each valve port 178 and 179 is provided with a disc valve 180 slidably confined therein, together with a spring 181 to hold the valve open against a selected fluid pressure. When the vehicle starts to move between zero and ten miles per hour, relatively low fluid pressure ranging from zero to three pounds per square inch is developed in the cylinder 152, to work against the piston 151 and to overcome the reactance of the compression spring 163. As the vehicle speed approaches approximately 10 miles per hour and pressure of approximately three pounds per square inch is developed, the piston 151 remains in the full line position indicated at station X. At this point the port 178 would be blocked off and the pressure would be built up relatively fast. The piston 151 stays at station X until the pressure builds up to a point where the piston can be moved toward station Y. When the vehicle speed exceeds approximately 10 miles per hour and pressure better than three pounds per square inch is developed, then the piston starts to move away from station X, whereby the port 174 by-passes the pressure not required to move the piston. As the speed of the vehicle increases and the pressure increases above three pounds per square inch, then the expansion of the valve spring 163 is overcome at approximately four pounds per square inch, and the valve 180 in the port 178 is closed. This immediately causes a fast build up of pressure and moves the piston 151 to the station Y where the ports 175 and 179 are blocked off, which movement also accomplishes a shift of gears from low to intermediate speed. The piston 151 stays at station Y until the vehicle speed approaches 20 miles per hour, and the pressure builds up to approximately seven pounds per square inch, when the piston may be moved toward station Z. When the vehicle speed exceeds 20 miles per hour and the pressure better than seven pounds per square inch, then the piston starts to move away from station Y, uncovering the ports 175 and 179 and by-passing the pressure not required to move the piston. As the speed of the vehicle increases above 20 miles per hour, and the pressure increases above seven pounds per square inch, then the expansion of the spring 181 in the port 179 is overcome at approximately eight pounds per square inch, and the valve 180 in the port 179 does not effect the ports 174 and 175. When the speed of the vehicle actuates the shifting devices 138 and 30 respectively, the ports 172 or 173 are always open to communication with the cylinder ports 174, 175 and 176 and a portion of the pump pressure, not required to move the piston 151, is by-passed thru said cylinder ports.

Figures 1, 10:
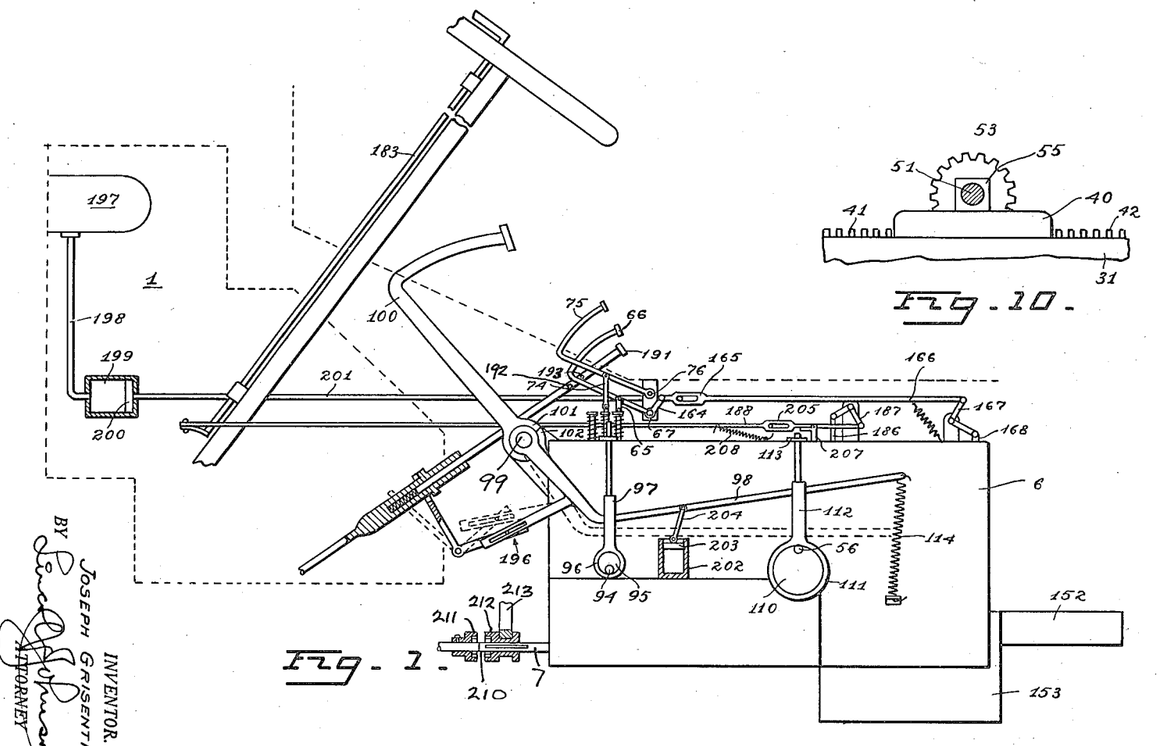
Fig. 1 represents a side elevation of an automobile transmission having a gear shifting mechanism constructed in accordance with my invention applied thereto.
Fig. 10 is an enlarged detail of one of the gear shifting elements, together with the locking cam thereon.

If it should be desired to keep the vehicle travelling in high gear but at a relatively low speed, such as 10 or 15 miles per hour, the valve 171 would be moved to block off the ports 174, 175, and 176 by the web between the ports 172 and 173, to thereby direct the entire output of the pump 154 against the piston 151 without by-passing any thereof thru the ports 174, 175, and 176. If it should be desired to travel the vehicle in either intermediate or low speeds, the pressure relief valve 182 would be manipulated by the hand control 183, as shown in Fig. 1, to by-pass pump pressure in sufficient quantity to keep the carriage 138 in co-ordinating position with the slide block for effecting the desired intermediate or low speed. The ports 173 register with the various ports 174, 175 and 176 whenever and at such times as the foot pressure is released from the ahead pedal 66. The larger ports 172 register with the various ports 174, 175 and 176 whenever and at such time as foot pressure is applied to the pedal 66, and the vehicle engine throttle is open between the minimum and maximum limits, to control the volume of fuel being admitted to the engine. Depressing movement of the ahead pedal 66 causes a sliding movement of the slide 171 to move the larger ports 172 relative to the openings 174, 175 and 176, whereby the vehicle operator may regulate the pressure discharge and time and synchronize the amount of gas consumption with the most economical driving speeds of the vehicle. When the web between the ports 172 and 173 of the slide valve 171 lies opposite the respective openings 174, 175 and 176, then no fluid pressure may be discharged from the cylinder 152 and sa a result, the accumulated pressure in the cylinder would be directed against the piston and it would be moved to the position shown in Fig. 3, and thereby maintain the high speed gears of the transmission in engagement and the surplus pressure would be discharged outwardly through the endmost port 177.

In order to shift the gears downwardly from the high speed to either the intermediate, or the low speeds, it is accomplished automatically by the speed of rotation of the propeller shaft actuated by the traction wheels. As the speed of the propeller shaft slows up, the pump 154 is caused to develop less pressure, whereby the compressed expansion spring 163 causes the piston 151 to be moved in the rearward direction, that of the arrow B, from the station Z to the station Y. During this phase of movement of the piston, the carriage 138 indirectly causes the sleeve 120 to rotate the gear 128 on the shaft 12 and to move the rack 80 and start the slide block 30 in the direction of the arrow B. As the slide block 30 commences its rearward movement, the clutch rack 37 reacts with the clutch pinion 57 to disengage the clutch, and in timed relation the rack 42 reacts with the pinion 53 to disengage the high speed gear, and simultaneously and in following sequence, the rack 42 engages the pinion 53 to effect engagement of the intermediate speed gear. In dropping down from high gear to intermediate gear, the carriage 138 passes from beneath the discs on the shaft 12 and stops at a point between the shafts 11 and 12, at which point the carriage 138 remains until the slide block 30 reaches a point where the intermediate gears of the transmission engage, to permit the carriage 138 to return another stroke in the rearward direction. If the propeller shaft speed should become relatively slow, then likewise the pressure developed by the pump would decrease, and the expansion spring 163 would urge the piston 151 and carriage 138 rearwardly to a point where the carriage 138 would abut against the stop pin 190. As a result, the disc on the carriage 138 indirectly causes the gear 128 on the shaft 11 to engage the rack 80, and cause the continuance of movement of the slide block 30 in the rearward direction. This step in the return movement of the slide block, causes the engine clutch to be declutched, the intermediate speed gear to be disengaged, the low speed gear engaged and the clutch re-engaged and the carriage 138 returned to a point approximating the starting position.

The operation of the gear shift mechanism is automatic and at the same time is under direct control of the operator by means of the hand control 183 on the relief valve 182 and the relief port 184 in the cylinder 152. The valve 182 is provided with a gear rack on an end thereof, meshing with a gear segment 185 swingly mounted within the reservoir 153. The segment 185 is moved by a link 186, bell crank 187, link 188, and control lever 183, indicated in Fig. 1 on the vehicle steering wheel column.

When the hand lever 183 is manipulated to open the valve 182, the entire fluid pressure is immediately by-passed, and the expansion spring 163 pushes the piston 151 is a rearward direction, and automatically disengages the high and intermediate, and engages the low speed gears in succession.

In an automotive vehicle equipped with my gear shifting mechanism, the forward speed thereof, is controlled entirely by the pedal 66, which pedal works is definite relation to the engine throttle 191. A pin 192 is provided on the engine throttle beneath the under side of the pedal 66, so that the swinging movement of the pedal from its normal inoperative position down to a point where it will contact the pin 192, first causes the bar 64 to be lowered and the link 168 on the valve 171 to be lifted, before further downward movement of said pedal 66 reacts with the pin 192, to cause the engine speed to increase to a point where, as the low speed gear in the transmission engages, the vehicle may move in a forward direction. Whenever the low, intermediate, or high speed gears are engaged, the speed of the vehicle is controlled by foot pressure applied to the pedal 66, which reacts both with the engine throttle 191, and also with the slide valve 171, to regulate the position of said valve 171 with respect to the discharge or building up of fluid pressure in the cylinder 152.

Whenever the vehicle engine would stall or for any other cause the vehicle would come to a standstill, it is necessary to bring the gear shifting mechanism back into the starting or neutral position. From the neutral or starting position, the slide block 30 may be moved in either the forward or reverse direction. My gear shifting mechanism must be manipulated to a certain extent in the same manner as the conventional gear shifting mechanism on a vehicle, in that a shift cannot be made from the low speed to the reverse speed or vice versa, without causing the movement of the vehicle to be brought to a stop.

A timed relationship is desirable between the ahead pedal 66 and the port openings 172 and 173 in the valve 171, whereby said port openings, to effect the discharge of fluid pressure from the cylinder 152, will be opened to a degree most effective with economical operating speeds of the engine. Specifically, the ahead pedal 66 would be timed to regulate the port openings in the valve 171 so that the vehicle might travel in high speed with a minimum of gas or energy required to run the engine 1.

The reversing pedal 75 is moved in relation to a pin 193 on the throttle 191, whereby depressing movement of the reverse pedal 75 serves the double purpose of engaging the parts of the mechanism necessary to move the vehicle in reverse and also operates the engine throttle to thereby drive the vehicle at any desired rate of speed in the reverse direction.

As shown in Fig. 1, a conventional type of foot throttle 195 is provided, said throttle being connected to the carburetor on the engine. A sliding and link connection 196 is interposed between the throttle 195 and the clutch lever extension 98, whereby the foot throttle is rendered inoperative whenever the engine clutch is disengaged by the lever 98. It is well known that the gears in an automative transmission cannot be shifted when the engine speed greatly exceeds that of the speed of rotation of the driving shaft, so that in conventional practice, the engine is not speeded up at the instant the transmission gears are being shifted. In my structure the hook-up between the engine throttle and the clutch shaft, prevents the throttle from being operated therewith, and at such times as the gears are being shifted.

In Fig. 1 I have also shown an intake manifold of the engine, designated by the numeral 197, connected by a pipe 198 to a suction chamber 199, within which a piston or diaphragm 200 is movably mounted. The suction piston 200 is connected by a rod 201, through the slip joint connection 165 to the rod 166, thereby to use the suction power of the engine for moving the slide valve 171.

A dash pot 202 having a piston 203 therein, connected by a link 204 to the clutch lever extension 98, is provided to assist in retarding the downward action of the lever 98 at such times as the engine clutch is being moved from the disengaged to the engaged positions.

A slip joint connection 205 is provided in the rod 188 which connects the operating mechanism for the relief valve 182 to the hand control throttle 183, whereby the slide block, through the abutment 206 may engage the stop member 207, which is connected to the rod 188 and extends within the casing 6 within the path of travel of the abutment 206. Whenever the slide block moves from the position shown in Fig. 2 rearwardly to either the neutral or reversing position, the abutment 206 through the stop member 207, actuates the relief valve operating mechanism and opens the relief valve to relieve pressure accumulations within the cylinder 152. Whenever the relief valve is opened by movement of the slide block 30, the slip joint 205 permits partial reciprocative movement of the rod 188 without transmitting such movement to the handle control 183. A tension spring 208 is connected to the rod 188 and to the casing 6 to normally hold the relief valve 182 in the closed position.

The shaft 7 which connects the engine to the mechanism for shifting the gears of the transmission, is broken as indicated at 210 in Fig. 1, and the abutting ends of the shaft are provided with the coacting parts 211 and 212 of a jaw clutch, the part 212 being slidably splined on one portion of the shaft, while the other jaw clutch part 211 is fixed to the other portion of the shaft. A fork 213 is related to the clutch 212 to shift it into and from engagement with the part 211. This clutch mechanism is utilized in the event the engine should stop operating for any cause, while the gears of the transmission are in engagement. Thus under such a condition, with the engine stopped, the jaw clutch parts 211 and 212 would be disconnected, thereby declutching the automatic gear shifting apparatus from the engine and allowing the engine to be again started without the drag or torque of the gear shifting apparatus thereupon. After the engine has been started in operation, the clutch parts 211 and 212 would be engaged so that thereafter the automatic gear changing mechanism would be operated in the manner heretofore described. Furthermore, if the vehicle should be stalled with the transmission gears in mesh, and the vehicle engine should cease operating, in order to again start the vehicle in motion, it would be necessary for the vehicle operator to manually depress the clutch pedal 100, which would thereby declutch the transmission and the gear shifting apparatus therefor, from the engine and permit the engine to be again set in motion without the drag of the transmission or the gear shifting apparatus thereupon.

It will be noted that the forks 64 and 73 are slidable axially on each sleeve on which the jaw clutch parts 63 and 71 are mounted, whereby the forks 64 and 73 may slide on said sleeves to permit acceleration of the engine through pressure applied to either of the respective pedals 66 and 75, at such times and whenever the aforementioned clutch parts are engaged. Similarly, the bar 105 is slidably mounted in the fork 104 to also permit acceleration of the engine whenever the jaw clutch parts for moving the slide 90 are engaged.

Having thus described this invention, what I claim and desire to secure by Letters Patent is:

1. In combination, an automotive vehicle having a selective speed gear transmission therein and means on said transmission to shift selected gears thereof; and means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; and coengaging parts on the slide block and bar to actuate the gear shifting means to effect the engagement and disengagement of the transmission gears thru movement of the slide block and bar.

2. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; and coengaging parts in the slide block and bar to actuate the gear shifting means to effect the engagement and disengagement of the transmission gears thru movement of the slide block and bar; and means to reciprocate said carriage in direct proportion to the speed of the vehicle.

3. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; an enclosed piston connected to said carriage adapted to be actuated by a fluid pressure generating pump communicating with said enclosed piston to supply fluid pressure thereto; and means to drive said pump in proportion to the speed of travel of the vehicle whereby the pressure applied against the piston varies between the minimum and maximum accordingly as the speed of the vehicle varies between the minimum and maximum.

4. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; fluid pressure actuated means to reciprocate the carriage in one direction; and spring means to move said carriage in the opposite direction.

5. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; and fluid pressure actuated means to move the carriage within the minimum and maximum limits of its reciprocative stroke accordingly as the speed of the vehicle varies between the minimum and maximum.

6. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; a closed cylinder; a piston in said cylinder connected to said carriage; a fluid pressure generating pump communicating with said cylinder to create fluid pressure to reciprocate said piston and carriage in unison; a primary valve to regulate the volume of fluid pressure to be accumulated in said cylinder for effecting selective reciprocative movements of the piston; and means to control the movement of said valve.

7. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; a closed cylinder; a piston in said cylinder connected to said carriage; a fluid pressure generating pump communicating with said cylinder to create fluid pressure to reciprocate said piston and carriage in unison; a primary valve to regulate the volume of fluid pressure to be accumulated in said cylinder for effecting selective reciprocative movements of the piston; means to control the movement of said valve; and a secondary valve to discharge the fluid pressure from the cylinder independent of the primary valve.

8. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive cams on the driven shafts to engage a gear on each of the same with a selected gear rack to move the slide block and bar progressively forward or rearward; coengaging parts on the slide block and bar to actuate the gear shifting means to effect engagement and disengagement of the transmission gears thru movement of the slide block and bar; an enclosed piston connected to said carriage adapted to be actuated by a fluid pressure generating pump communicating with said enclosed piston to supply fluid pressure thereto; means to drive said pump in proportion to the speed of travel of the vehicle whereby the pressure applied against the piston varies between the minimum and maximum accordingly as the speed of the vehicle varies between the minimum and maximum; and means to discommunicate the fluid pressure from contact with the piston.

9. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive selected gears on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; a closed cylinder; a piston in said cylinder connected to said carriage; a fluid pressure generating pump communicating with said cylinder to create fluid pressure to reciprocate said piston and carriage in unison; a primary valve to regulate the volume of fluid pressure to be accumulated in said cylinder for effecting selective reciprocative movements of the piston; means to control the movement of said valve; and spring means to move the piston in a direction opposite to that in which the piston is moved by the fluid pressure when the fluid pressure drops from the maximum to the minimum.

10. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the facing sides of said slide block and bar; a reciprocatable carriage engageable with successive selected gears on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; an enclosed piston connected to said carriage adapted to be actuated by a fluid pressure generating pump communicating with said enclosed piston to supply fluid pressure thereto; means to drive said pump in proportion to the speed of travel of the vehicle whereby the pressure applied against the piston varies between the minimum and maximum accordingly as the speed of the vehicle varies between the minimum and maximum; and spring means to move the piston in a direction opposite to that in which the piston is moved by the fluid pressure when the fluid pressure drops from the maximum to the minimum.

11. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a slide block and bar movably mounted on opposite sides of the row of driven shafts; a gear rack on each of the opposite sides of said slide block and bar; a reciprocatable carriage engageable with successive selected gears on the driven shafts to engage a gear on each of the same with a selected gear rack to move the slide block and bar progressively forward or rearward; coengaging parts on the slide block and bar to actuate the gear shifting means to effect the engagement and disengagement of the transmission gears thru movement of the slide block and bar; an enclosed piston connected to said carriage adapted to be actuated by a fluid pressure generating pump communicating with said enclosed piston to supply fluid pressure thereto; means to drive said pump in proportion to the speed of travel of the vehicle whereby the pressure applied against the piston varies between the minimum and maximum accordingly as the speed of the vehicle varies between the minimum and maximum; and means to move said slide block and bar from a reverse position to a neutral position, comprising, a gear rack on the slide block; a gear on one of said driven shafts selectively engageable with said gear rack to move the slide block from the reverse position forwardly to a neutral position; and coengaging parts on the slide block and bar to actuate the reverse gear shifting means to effect the engagement and disengagement of the transmission reversing gears thru movement of the slide block and bar.

12. A gear shifting mechanism including a driven shaft; a sleeve slidably splined on said shaft; a gear on said sleeve; a pair of circular discs arranged in spaced relation on said sleeve to move axially therewith, one of said discs being freely rotatable on the sleeve and the other disc being fixed to the sleeve and having a flattened side thereon; a circular disc reciprocatable on the fixed axis parallel to the axis of the driven shaft, and a portion of the periphery of said disc being in the path of travel of the fixed disc on the sleeve; a travelling carriage on the other side of said driven shaft having an inclined surface to move the rotatable disc on the sleeve and to contact the other disc on said sleeve with the offset disc and to thereby slide the latter disc until the flattened portion of the fixed sleeve disc lies substantially tangent to the periphery of the offset disc whereby the offset disc will move from one side of the plane of the fixed sleeve disc to the other and said fixed sleeve disc will rotate upon said offset disc to thereby move the sleeve with the gear thereon into meshing engagement with a matching gear.

13. A gear shifting mechanism including a driven shaft; a sleeve slidably splined on said shaft; a gear on said sleeve; a pair of circular discs arranged in spaced relation on said sleeve to move axially therewith, one of said discs being freely rotatable on the sleeve and the other disc being fixed to the sleeve and having a flattened side thereon; and each of said discs having bevelled peripheral edges; a circular disc reciprocatable on a fixed axis parallel to the axis of the driven shaft, and a portion of the periphery of said disc being in the path of travel of the fixed disc on the sleeve, and the whole of the periphery of said disc being bevelled; a travelling carriage on the other side of said driven shaft having an inclined surface engageable with the rotatable disc on the sleeve to move said disc and sleeve and to contact the fixed disc on said sleeve with the offset disc and to thereby move the latter disc until the flattened portion of the fixed sleeve disc lies substantially tangent to the periphery of the offset disc whereby the offset disc will move from one side of the plane of the fixed sleeve disc to the other and the beveled periphery of said fixed sleeve disc will rotate upon the beveled periphery of said offset disc to thereby move the sleeve with the gear thereon into meshing engagement with a matching gear.

14. A gear shifting mechanism including a driven shaft; a sleeve slidably splined on said shaft; a gear on said sleeve; a pair of circular discs arranged in spaced relation on said sleeve to move axially therewith, one of said discs being freely rotatable on the sleeve and the other disc being fixed to the sleeve and having a flattened side thereon; a circular disc reciprocatable on a fixed axis parallel to the axis of the driven shaft, and a portion of the periphery of said disc being in the path of travel of the fixed disc on the sleeve; a travelling carriage on the other side of said driven shaft having a circular disc reciprocatable on a fixed axis parallel to the axis of the driven shaft and offset relative thereto, a portion of the periphery of said disc being movable into the path of travel of the fixed disc on the sleeve; and means to move the offset discs until the flattened portion of the fixed sleeve disc lies substantially tangent to the periphery of the offset discs, whereby the offset discs will move from one side of the plane of the fixed sleeve disc to the other and said fixed sleeve disc will rotate against said offset discs to thereby move the sleeve with the gear thereon into meshing engagement with a matching gear.

15. A gear shifting mechanism including a driven shaft; a sleeve slidably splined on said shaft; a gear on said sleeve; a pair of circular discs arranged in spaced relation on said sleeve to move axially therewith, one of said discs being freely rotatable on the sleeve and the other disc being fixed to the sleeve and having a flattened side thereon, and each of said discs having bevelled peripheral edges; a circular disc reciprocatable on a fixed axis parallel to the axis of the driven shaft, and a portion of the periphery of said disc being in the path of travel of the fixed disc on the sleeve, and the whole of the periphery of said disc being beveled; a travelling carriage on the other side of said driven shaft having a circular disc reciprocatable on a fixed axis parallel to the axis of the driven shaft and offset relative thereto, a portion of the periphery of said disc being movable into the path of travel of the fixed disc on the sleeve and an inclined surface on said carriage engageable with the rotatable disc on the sleeve to move said disc and sleeve and to contact the other disc on said sleeve with the offset discs and to thereby move the latter offset discs until the flattened portion of the fixed sleeve disc lies substantially tangent to the periphery of the offset discs whereby the offset discs will move from one side of the plane of the fixed sleeve disc to the other and the beveled periphery of said fixed sleeve disc will rotate against the beveled periphery of said offset discs to thereby move the sleeve with the gear thereon into meshing engagement with a matching gear.

16. A gear shifting mechanism including a driven shaft; a sleeve slidably splined on said shaft; a gear on said sleeve; a pair of circular discs arranged in spaced relation on said sleeve to move axially therewith, one of said discs being freely rotatable on the sleeve and the other disc being fixed to the sleeve and having a flattened side thereon; a circular disc reciprocatable on a fixed axis parallel to the axis of the driven shaft and a portion of the periphery of said disc being in the path of travel of the fixed disc on the sleeve; a travelling carriage on the other side of the driven shaft having an inclined surface engageable with the rotatable disc on the sleeve to move said disc and sleeve and to contact the other disc with the offset disc and to thereby move the latter disc until the flattened portion of the fixed sleeve disc lies substantially tangent to the periphery of the offset disc whereby the offset will move from one side of the plane of the fixed sleeve disc to the other and said fixed sleeve disc will rotate against said offset disc to thereby move the sleeve with the gear thereon into meshing engagement with a matching gear; and a flattened surface on the carriage engageable with the fixed disc on the sleeve to maintain the sleeve in the moved position and the gear engaged.

17. A gear shifting mechanism including a driven shaft; a sleeve slidably splined on said shaft; a gear on said sleeve; a pair of circular discs arranged in spaced relation on said sleeve to move axially therewith, one of said discs being freely rotatable on the sleeve and the other disc being fixed to the sleeve and having a flattened side thereon, and each of said discs having beveled peripheral edges; a circular disc reciprocatable on a fixed axis parallel to the axis of the driven shaft, and a portion of the periphery of said disc being in the path of travel of the fixed disc on the sleeve, and the whole of the periphery of said disc being beveled; a travelling carriage on the other side of said driven shaft having a circular disc reciprocatable on a fixed axis parallel to the axis of the driven shaft and offset relative thereto, a portion of the periphery of said disc being movable into the path of travel of the fixed disc on the sleeve and an inclined surface on the carriage engageable with the rotatable disc on the sleeve to move said disc and sleeve and to contact the fixed disc on said sleeve with the offset discs and to thereby move the latter discs until the flattened portion of the fixed disc on the sleeve lies substantially tangent to the periphery of the offset discs whereby the offset discs will move from one side of the plane of the fixed disc on the sleeve and the beveled periphery of said fixed disc will rotate against the beveled periphery of said offset discs to thereby move the sleeve with the gear thereon into meshing engagement with a matching gear;

and a flattened surface on the carriage engageable with the rotatable disc on the sleeve to maintain the sleeve in the moved position and the gear engaged.

18. In combination, an automotive vehicle having a selective speed gear transmission therein and means on said transmission to shift selected gears thereof; and means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a pair of circular discs arranged in spaced relation on said gear engaging means to move axially therewith, one of said discs being freely rotatable on the gear engaging means, and the other disc being fixed thereon and having a flattened side; a circular disc reciprocatable on a fixed axis parallel to the axis of the driven shaft and offset relative thereto, a portion of the periphery of said disc being in the path of travel of the fixed disc on the gear engaging means; a slide block and bar; a reciprocatable carriage engageable with successive discs on the driven shafts to engage a gear on each of the same with a selected gear rack to move the slide block and bar progressively forward or rearward, said carriage having an inclined surface engageable with the rotatable disc on the gear engaging means to move said disc and the gear engaging means and to contact the fixed disc on said gear engaging means with the offset disc and to thereby move the latter offset disc until the flattened portion of the fixed disc lies substantially tangent to the periphery of the offset disc, whereby the offset disc will move from one side of the plane of the fixed disc to the other and said fixed disc will rotate against said offset disc to thereby move the gear engaging means with a gear thereon into meshing engagement with a selected gear rack; and coengaging parts on the slide block and bar to actuate the gear shifting means to effect the engagement and disengagement of the transmission gears thru movement of the slide block and bar.

19. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a pair of circular discs arranged in spaced relation on said gear engaging means to move axially therewith, one of said discs being freely rotatable on the gear engaging means, and the other disc being fixed thereon and having a flattened side; a circular disc reciprocatable on a fixed axis parallel to the axis of the driven shaft and offset relative thereto, a portion of the periphery of said disc being in the path of travel of the fixed disc on the gear engaging means; a slide block and bar movably mounted on opposite sides of the row of driven shafts; a gear rack on each of the facing sides of said slide block and bar; a reciprocatable carriage engageable with successive discs on the driven shafts to engage a gear on each of the same with a selected gear rack to move the slide block and bar progressively forward or rearward; said carriage having an inclined surface engageable with rotatable disc on the gear engaging means to move said disc and the gear engaging means with the offset disc and to thereby move the latter disc until the flattened portion of the fixed disc lies substantially tangent to the periphery of the offset disc whereby said offset disc will move from one side of the plane of the fixed disc to the other and said fixed disc will rotate against said offset disc to thereby move the gear engaging means with a gear thereon into meshing engagement with a selected gear rack; and coengaging parts in the slide block and bar to actuate the gear shifting means to effect the engagement and disengagement of the transmission gears thru movement of the slide block and bar; and means to reciprocate said carriage in direct proportion to the speed of the vehicle.

20. In combination, an automotive vehicle having a selective speed gear transmission therein and means on said transmission to shift selected gears thereof; and means to automatically actuate the gear shifting means in accordance with the speed of the vehicle, comprising, a driving shaft; a plurality of driven shafts operated by said driving shaft and arranged in a single row, each of said shafts having a gear engaging means slidably splined thereon; a pair of circular discs arranged in spaced relation on said gear engaging means to move axially therewith, the lower one of said discs being freely rotatable on the gear engaging means, and the upper disc being fixed thereon and having a flattened side; a circular disc reciprocatable on a fixed axis parallel to the axis of the driven shaft and offset relative thereto, a portion of the periphery of said disc being in the path of travel of the upper disc on the gear engaging means; a slide block and bar; a reciprocatable carriage engageable with successive discs on the driven shafts to engage a gear on each of the same with a selected gear rack to move the slide block and bar progressively forward or rearward, said carriage having an inclined surface engageable with the lower disc on the gear engaging means to elevate said disc and the gear engaging means and to contact the upper disc on said gear engaging means with the offset disc and to thereby elevate the latter disc until the flattened portion of the upper disc lies substantially tangent to the periphery of the offset disc, whereby the offset disc will drop below the plane of the upper disc and said upper disc will rotate upon said offset disc to thereby move the gear engaging means with a gear thereon into meshing engagement with a selected gear rack to move the slide block in a forward direction and when said carriage is withdrawn from beneath the discs on the sleeve, the gear thereon disengages from its matching rack and drops into engagement with another gear rack on the slide block to move said slide block in the reverse direction; and coengaging parts on the slide block and bar to actuate the gear shifting means to effect the engagement and disengagement of the transmission gears thru movement of the slide block and bar.

21. A gear shifting mechanism including a driven shaft; a sleeve slidably splined on said shaft; a gear on said sleeve; a pair of circular discs arranged in spaced relation on said sleeve to move axially therewith, one of said discs being freely rotatable on the sleeve and the other disc being fixed to the sleeve and having a flattened side thereon; a circular disc reciprocatable on a fixed axis parallel to the axis of the driven shaft, and a portion of the periphery of said disc being in the path of travel of the fixed disc on the sleeve; a travelling carriage on the other side of said driven shaft having a circular disc reciprocatable on a fixed axis parallel to the axis of the driven shaft and offset relative thereto, a portion of the periphery of said disc being movable into the path of travel of the fixed disc on the sleeve; and means to move the offset discs until the flattened portion of the fixed sleeve disc lies substantially tangent to the periphery of the offset discs, whereby the offset discs will move from one side of the plane of the fixed sleeve disc to the other and said fixed sleeve disc will rotate against said offset discs to thereby move the sleeve with the gear thereon into meshing engagement with a matching gear and to disengage the gear by moving the carriage to withdraw the support thereof from beneath the discs on said sleeve, whereby said sleeve with the gear thereon will drop from the elevated position.

JOSEPH GRISENTI.